United States Patent [19]

Reiffel et al.

[11] Patent Number: 4,603,231
[45] Date of Patent: Jul. 29, 1986

[54] SYSTEM FOR SENSING SPATIAL COORDINATES

[75] Inventors: Leonard Reiffel; Wayne D. Jung, both of Chicago, Ill.

[73] Assignee: Interand Corporation, Chicago, Ill.

[21] Appl. No.: 480,652

[22] Filed: Mar. 31, 1983

[51] Int. Cl.⁴ .......................................... G08C 21/00
[52] U.S. Cl. .................................................. 178/19
[58] Field of Search ............................ 178/18, 19, 20; 340/706, 720; 364/520, 513, 581

[56] References Cited

U.S. PATENT DOCUMENTS

| | | | |
|---|---|---|---|
| 3,423,528 | 1/1969 | Bradshaw et al. | 178/19 |
| 3,497,617 | 2/1970 | Ellis | 178/19 |
| 3,593,115 | 7/1971 | Dym et al. | 178/19 |
| 3,617,630 | 11/1971 | Reiffel | 178/6.8 |
| 3,632,874 | 1/1972 | Malavard | 178/18 |
| 3,668,313 | 6/1972 | Dym | 178/19 |
| 3,671,668 | 6/1972 | Reiffel | 178/6.8 |
| 3,718,759 | 2/1973 | Reiffel | 178/6.8 |
| 4,110,556 | 8/1978 | Hawkes | 178/19 |
| 4,149,029 | 4/1979 | Pobgee | 178/18 |
| 4,158,747 | 6/1979 | Muller | 178/19 |
| 4,164,622 | 8/1979 | Pobgee | 178/18 |
| 4,198,539 | 4/1980 | Pepper, Jr. | 178/19 |
| 4,216,352 | 8/1980 | Chamuel | 178/19 |
| 4,217,649 | 8/1980 | Doundoulakis | 364/556 |
| 4,240,065 | 12/1980 | Howbrook | 340/146.3 SY |
| 4,246,439 | 1/1981 | Romein | 178/19 |
| 4,281,313 | 7/1981 | Boldridge, Jr. | 340/146.3 SY |
| 4,345,239 | 8/1982 | Elliott | 340/146.3 |
| 4,375,081 | 2/1983 | Blesser | 364/727 |
| 4,456,787 | 6/1984 | Schlosser | 178/19 |

FOREIGN PATENT DOCUMENTS 175138  5/1947  Japan.

Primary Examiner—Stafford D. Schreyer
Attorney, Agent, or Firm—Kirkland & Ellis

[57] ABSTRACT

A system for sensing the spatial position of a moveable object with respect to an energized conductive surface whereby the spatial coordinates of the object are determined. The system provides a means of accurately measuring the coordinates of the object with respect to a two-dimensional coordinate system independent of the third orthogonal dimension, thereby avoiding significant measurement errors due to variations of the object's position in the third orthogonal dimension. The system also ascertains the coordinate position of the object in this third dimension, which can then be utilized as an independent control variable in the system. Further, the system can accommodate a number of energized conductive surfaces over which the object may be positioned and can determine the spatial coordinates of the object with respect to any such surface. In general, the system of the present invention can ascertain the generalized n-tuple position vector of the object with respect to each of a plurality of generalized, energized conductive surfaces. In any of the foregoing forms, the energized conductive surfaces can be transparent.

36 Claims, 13 Drawing Figures

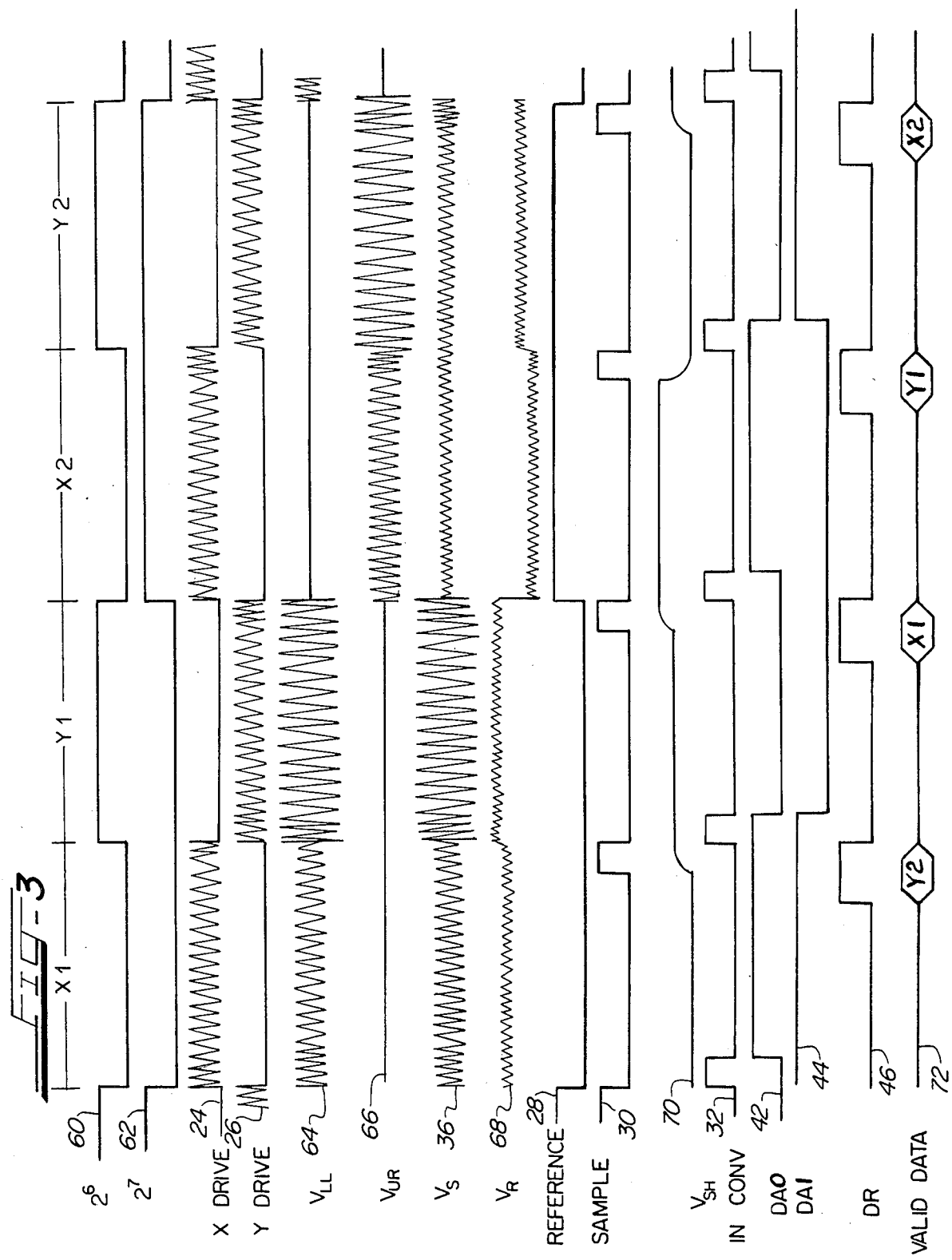

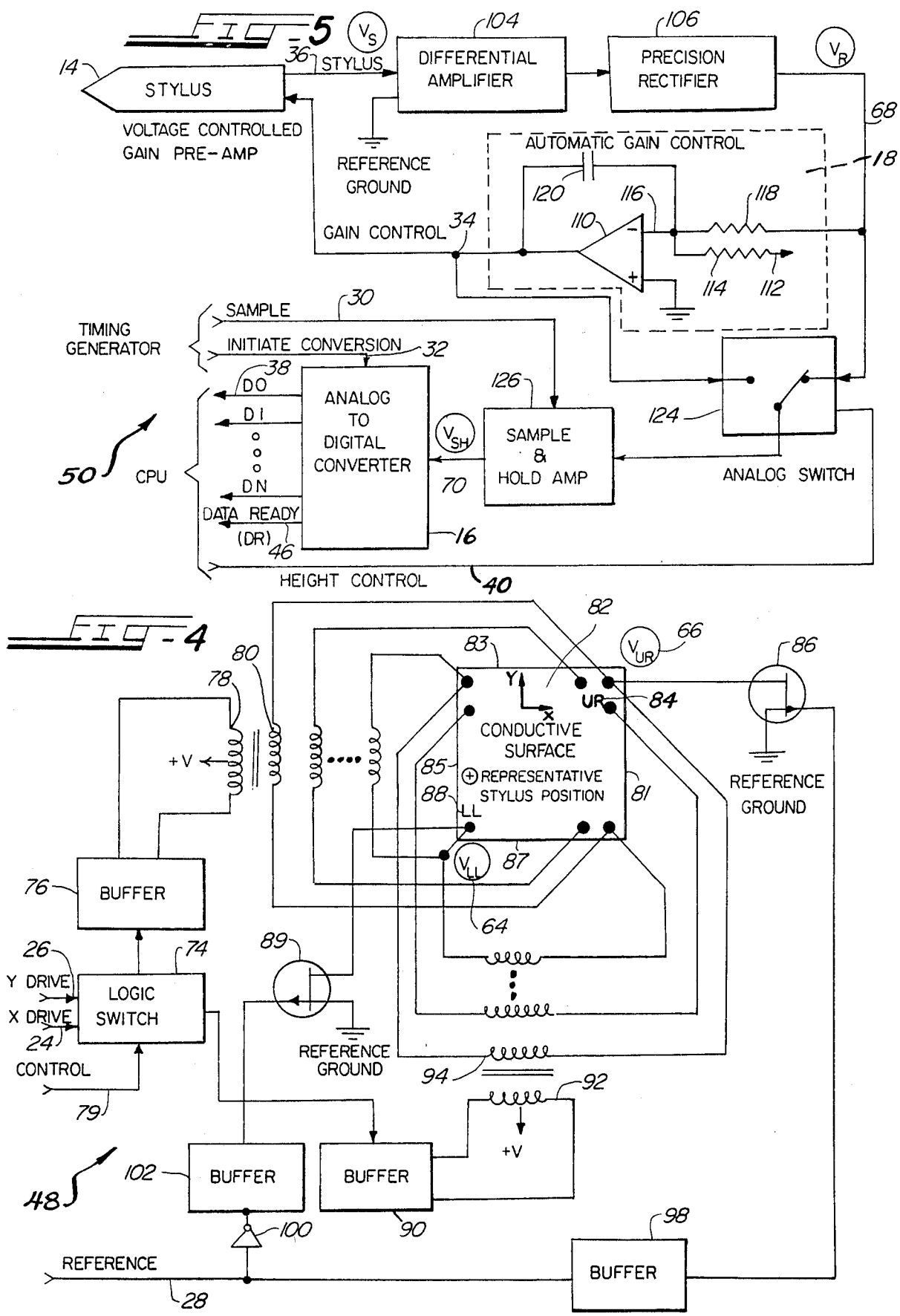

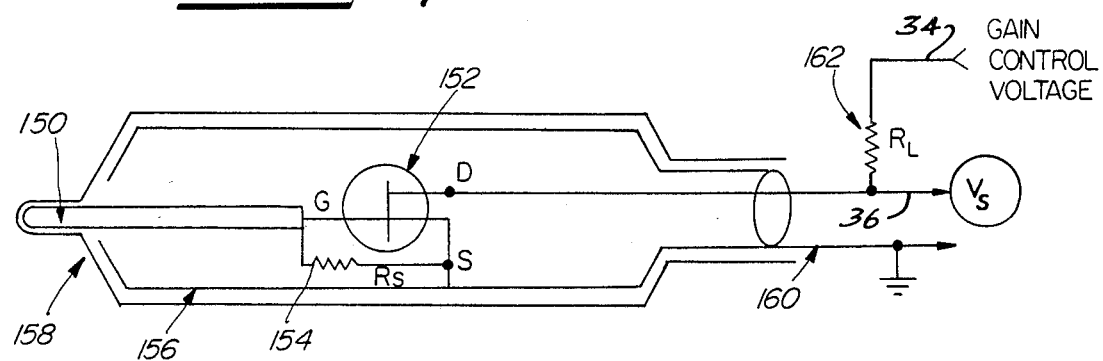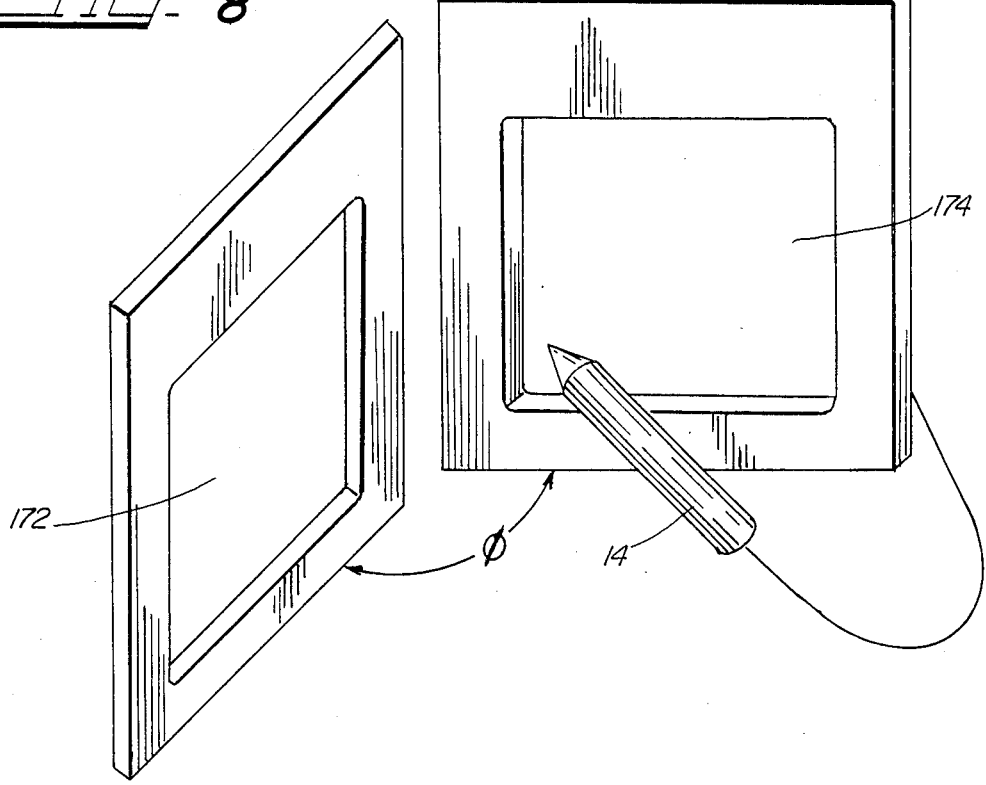

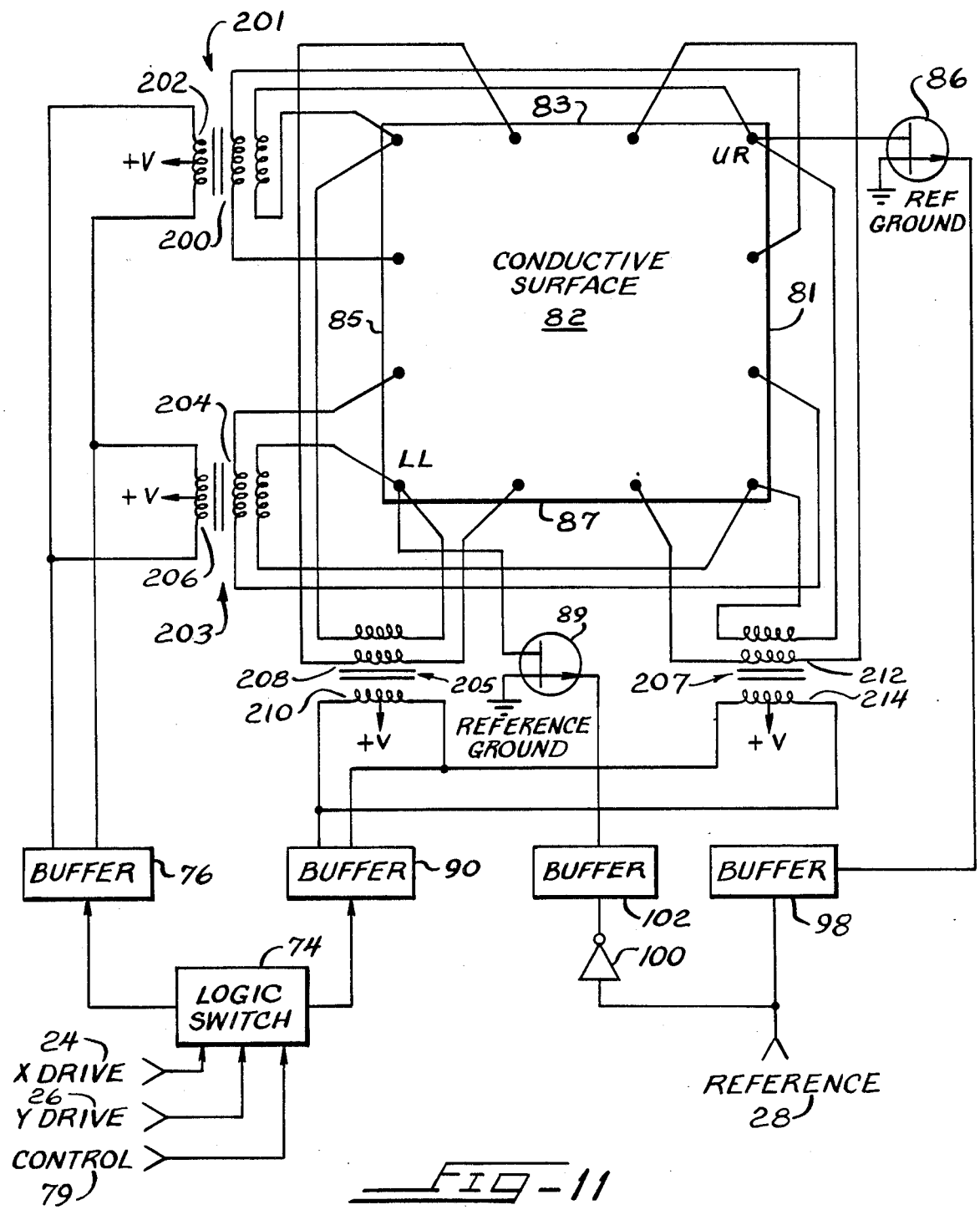

SYSTEM FOR SENSING SPATIAL COORDINATES

BACKGROUND OF THE INVENTION

1. Field of the Invention

The present invention relates to an improved system of sensing and determining electrical representations of the spatial coordinates of a moveable object, such as a pencil-like stylus ("stylus" and "probe" are used interchangeably herein), and further, to an improved system which accurately determines the position of the object with respect to a two-dimensional coordinate system independent of variations of the object in the third orthogonal dimension, while also measuring the position of the object in this third dimension. The system thus provides greater user comfort and flexibility, and expanded range of features.

2. Description of Prior Art

There are presently available a number of techniques for determining the position of an object in a two-dimensional coordinate system (e.g., an X-Y coordinate system). One such technique employs an electronic stylus operating with a so-called "bit-pad" as an input device, which can be used to provide geometric coordinates to computer graphics and Computer Aidd Design (CAD) systems. Among the most well known of these devices, although no longer in wide use, is the Rand Tablet, which employs a two-dimensional (X-Y) array of conductors carrying a variety of coded pulses that can be detected by a hand-held stylus probe. In this manner, the specific time-dependent pulse pattern induced on the probe at any instant determines the X-Y coordinate position of the probe.

Prior art techniques use electrically-energized conducting surfaces that are directly contacted by or capacitively coupled to a stylus to obtain electrical representations of the stylus position in a manner analogous to a two-dimensional potentiometer. The stylus point corresponds to the wiper contact in an ordinary potentiometer while the conducting surface of finite resistivity corresponds to the resistive element of the potentiometer. In an ordinary potentiometer, the wiper slides back and forth linearly, while in a two-dimensional potentiometric position sensor, the stylus can, of course, move anywhere on the conductive surface. In yet another method of sensing two-dimensional positions, the stylus is attached by rigid or string-like members to a pair of potentiometers, the resistance of which varies with the position of the stylus as it slides along the X and Y axes. In addition, a flexible conductive membrane can be used to contact the primary potentiometric surface when the stylus or other object is pressed against such surface. Examples of some of these techniques are described in L. Reiffel, U.S. Pat. No. 3,617,630; R. D. Bradshaw et al., U.S. Pat. No. 3,423,528; A. B. E. Ellis, U.S. Pat. No. 3,497,617; L. C. Malavard, U.S. Pat. No. 3,632,874; and Japanese Pat. No. 175138.

More recent devices interpret the time of arrival at several microphones of ultrasonic acoustic pulses emitted from a probe to assign digital coordinate codes identifying the probe's position with respect to a two-dimensional or three-dimensional set of axes defined by the microphone array. still another technique utilizes the propogation time of relatively slow moving magnetostrictive pulses launched on an orthogonal array of iron alloy wires. In this technique, the stylus typically contains a coil which detects the passage of the magnetic pulse, thereby permitting its position to be determined. In a variation of this technique, the coil itself launches the flux pulses, which are then detected at the perimeter of the X-Y coordinate plane to determine the position of the stylus.

While many of these previously disclosed techniques of determining X-Y coordinate signals representing the position of a hand-held stylus or probe are useful, each technique has inherent disadvantages peculiar to its principle of operation. Potentiometric methods involving ohmic contact between the stylus and a conducting surface are subject to inaccuracies caused by contamination, physical wear or other damage to the conducting surface or the stylus. Flexible membrane techniques are subject to the tearing or cutting of the membrane. Acoustic techniques are subject to spurious enviromental effects, and the sound source required (usually spark gaps) typically is relatively short-lived or of limited range. Magnetostrictive methods involve special fabrication and calibration techniques, and have a limited acquisition range in the direction orthogonal to the main coordinate plane. Many of the foregoing techniques require opaque structures thereby limiting their usefulness in certain applications. In contrast, as discussed below, the present invention overcomes all of these foregoing disadvantages.

SUMMARY OF THE INVENTION

The present invention comprises an improved system of sensing and determining electrical representations of the spatial coordinates of a moveable object, such as a stylus or probe, with respect to an energized conductive surface. Such a surface can be planar, or more generally, of any arbitrary shape. The present invention enables the user to determine the position of the object with respect to a two-dimensional coordinate system (e.g., X-Y) independent of the third, generally orthogonal coordinate (e.g., height or "h") over a range approximating the allowable excursions in the X and Y coordinates. The present invention also permits the value of the orthogonal coordinate to be determined.

At the appropriate times and frequencies, applied voltage potentials cause currents to flow in directions parallel to the primary coordinate axes (e.g., the X and Y axes) to provide a unique set of voltages for each position on the energized conductive surface. A timing and switching means rapidly shifts the point of reference, with respect to which the X and Y field voltages are sensed by the probe, back and forth on the conductive surface. Shifting between two predetermined reference points at substantially opposite sides or corners of the energized conductive surface generates a pair of voltages for each coordinate axis associated with any location on the energized surface.

A probe employed in conjunction with the surface senses the X and Y voltages by capacitive coupling with the field. The rapid shifting of the reference point permits the probe to sense the two voltage measurements for each coordinate under substantially identical probe height and environmental conditions. After conditioning these voltage signals through an electronic means, a variable gain amplifying means and a control loop multiply each pair of signals by a term which varies in direct relation to changes in the orthogonal coordinate (i.e., height or "h") of the probe. Multiplying the two pairs of signals by such a variable term results in voltage signals that are essentially independent of height. The resulting voltaga signals are processed by a microprocessor to determine the X-Y coordinates representing the position of the stylus independent of its height above the surface conductor. In addition, monitoring the gain (scaling) term, which varies in relation to changes in stylus position in the orthogonal dimension, provides an accurate measurement of the height, h, of the stylus, which can be used as a third, independent system input variable.

More than one surface can be used with a single probe in the present invention, providing greater user flexibility. A polling means determines the surface over which the user places the probe before initiating the above-described process to determine the spatial coordinates.

Alternately, different surfaces may use different energizing frequencies, allowing discrimination among them by frequency selective techniques. Or different surfaces may be driven by time division multiplexing techniques allowing discrimination among them by time selective techniques.

The energized surface may be transparent, allowing it to be positioned in front of visual media and visual indices of any and all types thereby allowing visual coordination of uhe movable stylus with respect said visual media or indices.

These and other advantages of the present invention have been recently recognized and well-received by the public. For example, the present invention has recently been used to diagram football plays for network television viewers and to create "instant art" in the EPCOT Center at Walt Disney World.

A principal object of this invention is to overcome the aforesaid limitations and other disadvantages of the prior art techniques by providing an improved means of accurately determining the coordinates of an object with respect to a two-dimensional conducting surface (e.g., X and Y) over a range approximately equal to the dimensions of the X-Y conducting surface.

It is another object of the present invention to determine the position of the probe without significant errors or alterations due to substantial variations in the third, orthogonal dimension (e.g., height, "h").

It is another object of the present invention to minimize errors due to system imperfections, such as signal source variations or electrical non-linearities in the surface conductor.

It is another object of the present invention to provide a rugged, tamper-resistant stylus position sensing device, which can be completely protected by a thick layer of insulating material such as a transparent polycarbonate.

It is another object of the present invention to provide means for determining the position of the stylus in the direction orthogonal to the conductive surface.

These and other objects and advantages of the present invention are presented, by way of illustration and not limitation, by the following detailed description of a preferred embodiment of the present invention.

BRIEF DESCRIPTION OF THE DRAWINGS

FIG. 3 is a timing diagram illustrating the timing relationships between various signals utilized in a preferred embodiment of the present invention.

FIG. 4 is a circuit diagram for the energized conductive surface and drive circuitry in block 48 of FIG. 1.

FIG. 5 is a circuit diagram for the automatic gain control and analog to digital conversion circuitry in block 50 of FIG. 1.

FIG. 7 is a schematic diagram of the stylus utilized in a preferred embodiment of the present invention.

FIG. 8 is an oblique view of the multiple conductive surfaces utilized in an alternative preferred embodiment of the present invention.

FIG. 11 is a schematic illustration of an alternative preferred embodiment of the present invention using two pairs of transformers, wherein the primaries of each pair of transformers are connected in parallel.

DETAILED DESCRIPTION OF PREFERRED EMBODIMENT

Figure 1:
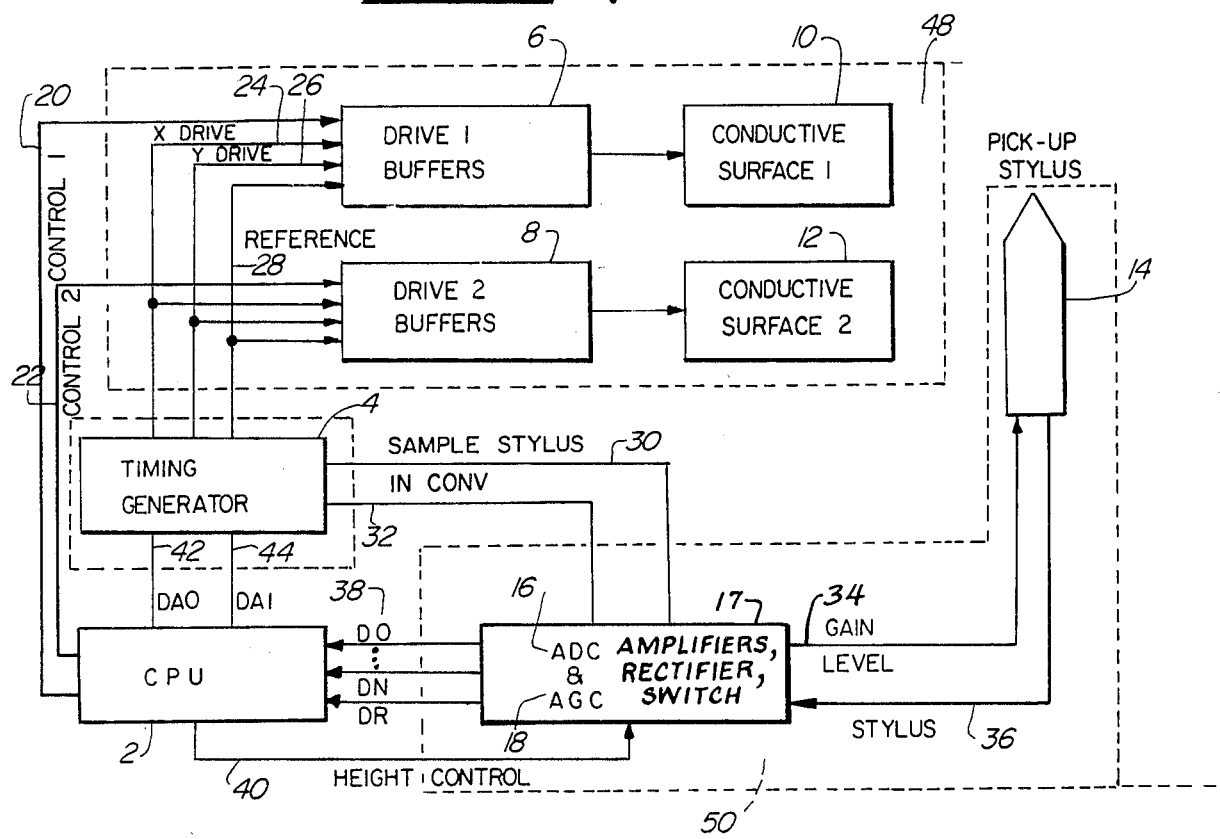
FIG. 1 is a block diagram illustrating a preferred embodiment of the spatial coordinate-sensing system of the present invention.

A preferred embodiment of the present invention uses as the energized conductive surfaces 10 and 12 in FIG. 1 a continuous surface of electrically conductive material of substantially uniform conductivity (e.g., a thin layer of gold deposited on a transparent acetate or on a glass substrate). More generally, the conductive media can be, for example, metallic, ionic or organic and the surface base can be any physically suitable material, or the conductive surface can be its own base.

A sheet-like electrical current is established in the surface; first the current flows in a direction parallel to one coordinate axis and then in a direction parallel to the other coordinate axis.

In another preferred embodiment, these current flows are simultaneous but of differing frequencies.

If the resistivity of the material through which the current is flowing is uniform, and if the contact points launching such current are sufficiently far away from the probe so as not to pick up any perturbations which may appear at the edges of the conductor, then the potential will increase with increasing displacement between the probe and the reference point. It is this increasing potential which is sensed by the stylus (see FIG. 1).

In an alternative embodiment, an energized conductive surface having non-uniform resistivity is used. In that case, the potential will increase non-linearly with increasing displacement between the stylus and the reference point; however, the potential will still be a monotonic function of the displacement, resulting in a unique correlation between potential and the displacement position with respect to the reference point. Displacement position is then determined by referring to a map of the resistance function of the surface conductor. Such a resistance map could be stored, for example, in memory accessed by the CPU 2 (see FIG. 1).

For the uniform resistivity planar case, and considering only a time when the current is flowing in the X direction, assume the total potential difference V drives a uniformly resistive sheet comprising a surface for a reference point of length D. The stylus position at any given X coordinate $X_i$ will experience a voltage $V_i(X)$ represented by:

$$V_i(X) = K_{(h)} V \frac{X_i}{D} \quad (1)$$

If the stylus were to actually contact the current sheet, K would equal 1. When the stylus is capacitively coupled to the current sheet, K is no longer equal to 1, but becomes K(h), a function of the capacitive coupling between the stylus and current sheet. This coupling varies with the separation ("h") between the stylus and current sheet. Together with the stylus-to-reference input impedance, it forms a voltage divider which confuses an otherwise simple relationship between V and X, since h is independently variable. When such coupling varies with h, the voltage experienced by the stylus at any given X coordinate for a reference point 1 becomes:

$$V_1(X,h) = K_{(h)} V \frac{X_1}{D} \quad (2)$$

The present invention utilizes a "Reference Point Shift" technique to measure the positions of the X and Y coordinates independent of the stylus height h. In this technique, the reference point for measuring the potential drop in the current sheet is switched at known times between two reference points at substantially opposite edges of the sheet. If Equation (2) represents the voltage at any given X coordinate when measured from one reference point, the voltage measured from the second reference point at the opposite edge will be:

$$V_2(X,h) = K_{(h)} V \frac{X_2}{D} \quad (3)$$

The above two voltages, $V_1$ and $V_2$, can be sensed by the stylus at any distance X and any height h. By employing this technique, a sum of these two voltages can be calculated which is entirely independent of X:

$$V_1(X,h) + V_2(X,h) = K_{(h)} V \frac{X_1 + X_2}{D} \quad (4a)$$

$$V_1(X,h) + V_2(X,h) = K_{(h)} V \quad (4b)$$

$X_1 + X_2$ is the sum of the "X" axis displacement of the stylus from reference 1 and the "X" axis displacement of the stylus from reference 2. Therefore $X_1 + X_2$ is a constant equal to the "X" displacement between references 1 and 2, and is nominally equal to D. Thus, as shown by Equation 4b, $V_1 + V_2$ is independent of stylus position.

This sum, K(h)V, is still dependent on h; however, a height-independent measurement of the X coordinate can then be obtained by using this sum to drive an Automatic Gain Control ("AGC") circuit 18 (see FIG. 1) of gain G(h). G(h) is a gain fuction which varies in direct proportion with the stylus height h. Thus, the AGC circuit 18 forces S=K(h)V G(h), where S is some constant. For example, as the stylus 14 is moved farther away from the current sheet (h is increased), K(h) and G(h) decrease and increase, respectively, such that S remains constant at every h.

By forcing such a constant relationship, an output voltage can be measured which indicates the position of the X coordinate independent of the stylus height. Thus, applying the gain G(h) to the instantaneous stylus voltage shown in Equation (2) at any given coordinate $X_i$:

$$V_{OUT}(X_i) = G(h) V_i(X,h) = \frac{S}{K(h)V} K_{(h)} V \frac{X_i}{D} = S \frac{X_i}{D} \quad (5)$$

Therefore, this output voltage represents a measure of the X coordinate position of the stylus 14 which is independent of stylus height and many other perturbing factors which could affect the signal level voltage, so long as these factors are present identically during the times when both $V_1$ and $V_2$ are measured. This requirement can be easily satisfied by switching rapidly back and forth between $V_1$ and $V_2$ measurements.

The results of Equation 5 can be realized without an AGC circuit by calculating via a computer all of the terms in the equation. In this case, the term G(h) simply represents a variable determined from stylus signals rather than a variable gain of an amplifier.

The above discussion has considered only the time when current is flowing in the X direction. It is obvious that the Y coordinate can be similarly determined when current is flowing in the Y direction. It is also apparent that the $V_2$ measurement can be used rather than $V_1$ in the above calculations. Although the above "Reference Point Shift" technique has only described the shifting of reference points between two locations, it is to be understood that the same results can be obtained by shifting among more than two locations based upon mathematical relationships similar to the equations discussed above.

As stated above, the gain G(h) of the AGC circuit 18 is related to the stylus height h. Therefore, the stylus height h at any instant can be determined by monitoring G(h), which represents a measure of the stylus height independent of the X and Y coordinate positions. Measuring G(h) thus provides a means to use the stylus height as another independent system input variable. Practical examples of the advantages derived from such a third independent input variable include the ability to control the width of a line generated by employing the present invention with a video means which translates the measured coordinates into a graphic representation tracking the probe's movements, to vary the intensity of the colors available in such graphic representations, and to alter the size of a graphical symbol.

An alternate embodiment of the present invention employs voltage ratio $V_1/V_2$, rather than using AGC circuit 18 to force the sum of $V_1+V_2$ to a constant value as described above. Inspection of Equations (2) and (3) reveals that the voltage ratio $V_1/V_2$ is also independent of stylus height:

$$V_1/V_2 = \frac{KVX_1}{D} / \frac{KVX_2}{D} = \frac{X_1}{X_2} \qquad (6)$$

This ratio can be readily calculated to determine the X coordinate position by microprocessing or other well known computation means. Using this technique, the sum of $V_1 + V_2$ provides a third system input variable as does the above method of the preferred embodiment, as shown by Equation 4b.

To prevent errors due to zero or very small $V_2$, which would have a substantial impact on the voltage ratio when X approaches D, it is desirable to limit the effective range over which X can vary to approximately between 0.1D and 0.9D. Such limiting can be accomplished by designing the conductive surface such that the outer edges, where X is less than 0.1D or greater than 0.9D, are not physically accessible to the user.

Equation (5) and equation (6) assume that $V_1$ and $V_2$ are linear functions of X and that the height dependence is a separable function K(h). However, such linear voltage functions are not necessary to the successful operation of the present invention so long as $V_1$ and $V_2$ are monotonic functions of X. In the event $V_1$ and $V_2$ are not linear functions, available techniques, such as a digital look-up table, can be used to ascertain the value of X for any given $V_1$ and $V_2$.

Figure 9:
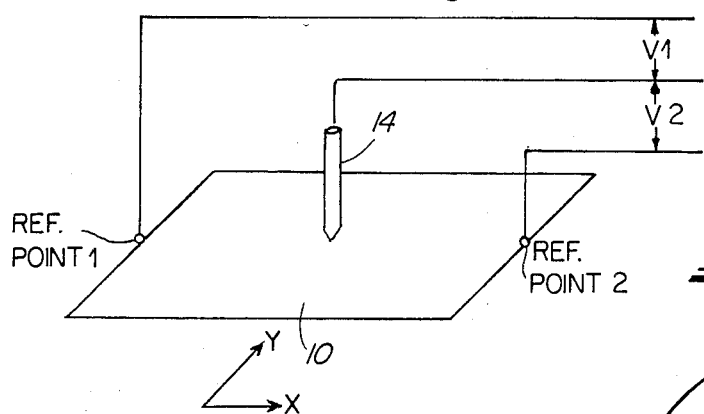
FIG. 9 is a schematic illustration of the relationship between voltages $V_1$ and $V_2$ and two reference points with respect to which the voltages $V_1$ and $V_2$ are determined in a preferred embodiment of the present invention.

The relationships among the X coordinate, reference points 1 and 2, the position of stylus 14 with respect to conductive surface 10 and voltages $V_1$ and $V_2$ are illustrated schematically in FIG. 9.

While the present invention has been described largely in terms of a planar and rectilinear coordinate system, it is obvious that other conductor shapes and coordinate systems may be employed without departing from the spirit of the invention. For example, portions of spheres or cylinders can be employed rather than a flat plane. In addition, while typical uses of this coordinate sensing technique require active areas of a few square feet, the present invention has been successfully employed with very large sensors spanning tens of square feet. For such large sensors, the maximum stylus distance h can be greater than several feet.

One prefered embodiment of the present invention will now be described in detail. In addition to discussing the actual circuitry which utilizes the "Reference Point Shift" technique described above, a method which permits the operating of a single stylus over several sensor surfaces in a similar manner will be described. This result is advantageous, for example, in using a stylus to select a general system characteristic (e.g., the color of an electronic graphic to be created by a computer) by touching one sensor surface (i.e., the color palette), and then actually drawing the graphic on another sensor (i.e., the "canvas") which is mounted on a color display.

With reference to FIG. 1, central processing unit ("CPU") 2 having an arithmetic logic unit operates with timing generator 4 to provide the X and Y drive and timing waveform 24 and 26, respectively, for the system. Upon receiving the appropriate signals from CPU 2 and timing generator 4, drive buffers 6 and 8 provide current for the transformers 144 (see FIG. 6) which supply the X and Y current flows through the sensor surface, hereinafter referred to as a "conductive surface". The embodiment in FIG. 1 illustrates two such conductive surfaces, 10 and 12. The stylus (probe) 14 is capacitively coupled to the surface potential. Automatic gain control ("AGC") circuitry 18 (also referred to as AGC integrator circuit 18 in FIG. 5) and analog to digital conversion ("ADC") circuitry 16 included in circuit block 17 of FIG. 1 (the elements contained in circuit block 17 are more fully illustrated in FIG. 5) condition and digitize the output signal from stylus 14 for input to CPU 2.

Drive buffers 6 and 8 provide alternating current to conductive surfaces 10 and 12, respectively. Timing generator 4 supplies the input signals to buffers 6 and 8 so as to cause them to alternately supply the current to each pair of edges of the conductive surfaces 10 and 12. Thus, current is supplied to the pair of opposing edges perpendicular to the X axes (e.g., edges 81 and 85 in FIG. 4) for a short period of time, and then to the opposing edges perpendicular to the Y axes (e.g., edges 83 and 87 in FIG. 4) for another short period of time.

Figure 6:
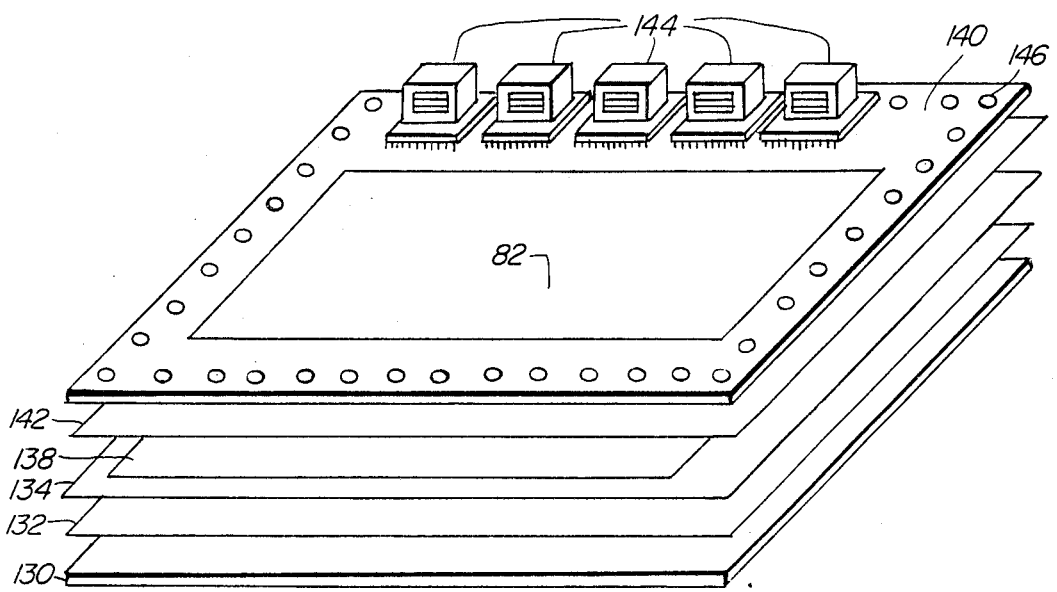
FIG. 6 is a schematic illustration of the construction of the conductive surfaces 10 and 12 in FIG. 1.

As previously described, surfaces 10 and 12 are constructed of a continuous electrically conducting material of uniform resistivity 134 (see FIG. 6). Thus, at any moment, an alternating current sheet will be flowing between one pair of opposing edges, and later such current will flow between the other pair of opposing edges. The alternating potential measured by the stylus 14 is therefore a variable in both time and position, depending upon which pair of edges are being supplied current and upon the relative position of stylus 14 as described by Equation (2).

Although the preferred embodiment illustrates time domain multiplexing whereby current is alternately supplied to the two pairs of edges of each tablet, it should be understood that the present invention can also be implemented using frequency multiplexing. With frequency multiplexing, two alternating currents of different frequencies are simultaneously impressed between the two pairs of edges. It should also be understood that the present invention can also be implemented by driving the X and Y axes in quadrature.

To implement the "Reference Point Shift" technique, it is necessary to fix two reference points for each axis. In the preferred embodiment of the surface and drive circuitry 48 illustrated in FIG. 4, two diagonally opposing corners 84 and 88 of the surface 82 are alternately clamped to a common potential (or ground) with a pair of FETs 86 and 89, respectively. The corners chosen in the embodiment illustrated in FIG. 4 are the lower left ("LL") corner 88 and upper right ("UR") corner 84, although other locations are also suitable. When the LL corner 88 is clamped to common, the stylus potential measured relative to the common will increase as the stylus 14 is moved towards the right edge 81, as described in Equation (2). Similarly, at a later instant when current is flowing in the Y direction, the stylus potential measured relative to common will increase as the stylus is moved towards the top edge 83 (as described in Equation (2) with Y as the variable). Similarly, when the UR corner 84 is claimped to common, the stylus potential measured relative to common will increase as the stylus moves toward the left edge 85 or bottom edge 87 (Equation (3) with X and Y, respectively, as the variable). As described above, as the stylus 14 is lifted away from the conductive surface 82, the stylus potential measured relative to both the LL and UR corners 88 and 84, respectively, will decrease and thus the averaged potential of the two signals over time, will decrease due to the decreased capacitance (or the increased impedance) between the stylus 14 and the surface 82 in a manner described by the function K(h).

Figure 2:
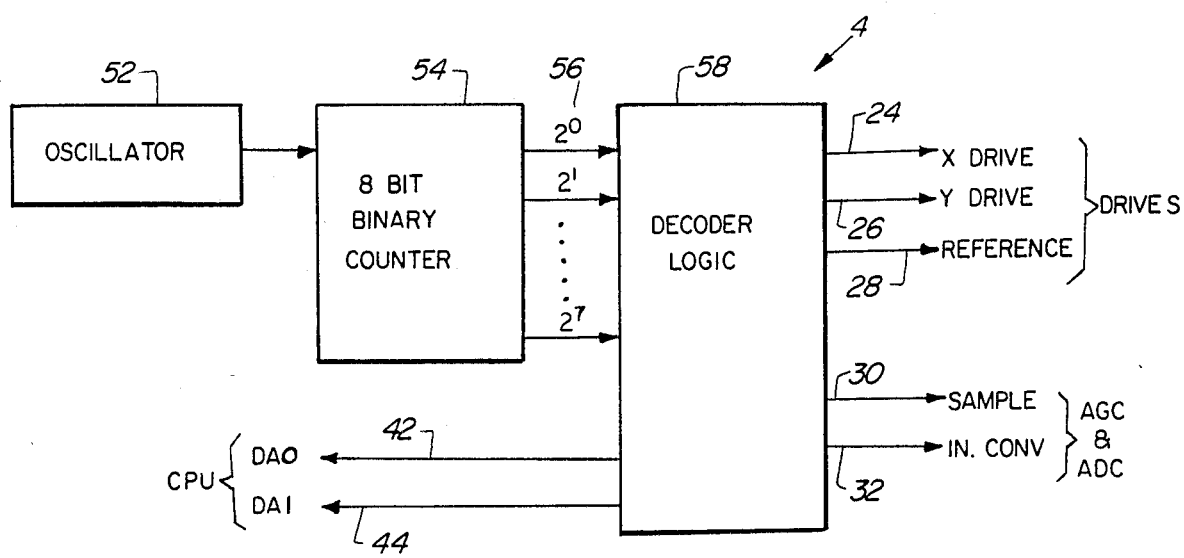
FIG. 2 is a circuit diagram of timing generator 4 in FIG. 1.

The circuitry for timing generator 4 illustrated in FIG. 2 provides the X and Y drive and timing waveforms 24 and 26, respectively, for the system. These signals, discussed below, include the $2^0$–$2^7$ signals 56 output by 8-bit binary counter 54, and the X drive 24, Y drive 26, Reference 28, Sample 30, In Conv 32, DA0 42 and DA1 44 signals output by the decoder logic 58.

Timing generator 4 (see FIG. 2) consists of high frequency oscillator 52, 8-bit binary counter 54 and decoder logic 58, which decodes the output signals 56 of binary counter 54. The oscillator frequency selected is sufficiently high (e.g., 1 MHz) to insure that the alternating field generated by the surface can be measured easily by capacitively coupled stylus 14. All components contained in timing generator 4 are commercially available parts. The decoder logic 58 is constructed of either look-up table PROMs, PALs or sequential logic components.

FIG. 3 illustrates the timing relationships between the various signals utilized in the preferred embodiment of the present invention. The digital logic states of the $2^6$ and the $2^7$ signals 60 and 62, respectively, output from binary counter 54 (only these two signals from the 8-bit counter 54 are shown for illustrative purposes) to decoder logic 58 illustrate how the X and Y drive waveforms 24 and 26, respectively, alternate on and off. As illustrated in FIG. 3, when the $2^6$ signal is a "1" and the $2^7$ signal is a "0" the Y drive 26 is active. Similarly, the Y drive 26 is also active when both signals are "1", and the X drive 24 is active in the other two logical states. Thus, when the X drive 24 is active, the Y drive 26 is off, and vice versa.

The envelope waveform generated by timing generator 4 which gates the X and Y drive waveforms 24 and 26, respectively, "on" then "off" has a 50% duty cycle to insure that each drive is active for an equal period of time, and that both drive waveforms are never simultaneously on. Timing generator 4 also produces a reference waveform 28, illustrated in FIG. 3, that oscillates at one-half the frequency of the X and Y drive envelope frequency. This reference waveform 28 controls the FETs 89 and 86 (see FIG. 4) connected to the LL and UR corners 88 and 84, respectively, of the surface 82 to alternately switch the two corner FETs 89 and 86 to low and high impedance states. Since the FETs 89 and 86 are switched at a rate equal to one-half the rate that the X and Y drive waveforms 24 and 26, respectively, are switched, the behavior of the potential at any point on the surface 82 can be divided into four periods of time, designated as X1, Y1, X2 and Y2 in FIG. 3. These four time periods are of equal duration. In period X1, the X drive 24 is active and the UR corner 84 is clamped to common. In period Y1, the Y drive 26 is active while the UR corner 84 is still clamped to common. Similarly, in periods X2 and Y2, the LL corner 88 is clamped to common. In region X2, X drive 24 is active, and in region Y2, Y drive 26 is active. The order of the four periods is interchangeable; however, it is assumed herein that the order is X1, Y1, X2 and Y2 as illustrated in FIG. 3, where $V_{LL}$ 64 and $V_{UR}$ 66 represent the potentials (drain to source) in the four time regions across the LL corner FET 89 and the UR corner FET 86 respectively.

Timing generator 4 produces additional timing signals that pass to CPU 2 and to ADC 16 and to sample and hold amplifier 126. ADC 16 receives a signal that initiates the conversion process of ADC 16 (the "IN CONV" signal). Timing generator 4 produces another signal (the "sample" signal) that triggers the sample and hold amplifier circuit 126 (see FIG. 5), the output of which is digitized in ADC 16. Timing generator 4 outputs two other signals to CPU 2, the "DA0" 42 and "DA1" 44 signals, which permit CPU 2 to determine the time period for which it is reading data in order to facilitate subsequent calculation. The timing relationship among the foregoing signals is discussed hereinafter.

FIG. 4 illustrates a more detailed diagram of the surface and buffer drive circuitry 48 in FIG. 1. for a single illustrative conductive surface 82. (FIG. 1 illustrates two conductive surfaces 10 and 12, while for clarity, FIG. 4 illustrates only a single conductive surface 82). Although many other types of drives may be used, the preferred embodiment utilizes transformers 78 and 92 with multiple secondaries 80 and 94, respectively, to provide the required potential differences across the surface 82. In a typical transformer wiring arrangement, each surface has two pairs of sides, that are in ohmic contact with two corresponding sets of transformers. Thus, in the preferred embodiment illustrated in FIG. 4, one transformer 78 has its secondaries 80 connected to one pair of sides 83–87 (e.g., perpendicular to the Y axis), and the other transform 92 has its secondaries 94 connected to the other pair of sides 81–85 (e.g., perpendicular to the X axis). Thus, as illustrated in FIG. 4, transformer set 92 and 94 drives the X axis, and transformer set 78 and 80 drives the Y axis.

The primaries of transformers 92 and 78 are connected to X and Y drive buffers 90 and 76, respectively. These buffers condition (by filtering out the higher frequency harmonics) the digital drive square wave signals produced by timing generator 4 before driving the X and Y transformers, 92 and 78 respectively.

With reference to FIG. 4, the X and Y drive waveforms 24 and 26, respectively, from timing generator 4 are input to logic switch 74, which is activated by a control signal 79 from CPU 2. In this manner, CPU 2 has control over which surfaces are activated by switching logic switch 74 on and off at the appropriate times. The preferred embodiment in FIG. 1 employs two such control signals 20 and 22, which are input to the drive buffers 6 and 8 for surfaces 10 and 12 respectively.

The reference signal 28 from timing generator 4 (see FIGS. 1 and 4), discussed above, is applied to the FET buffers 98 and 102. This reference signal 28 passes to the UR buffer 98 whose output supplies a signal that varies the gate potential of UR corner FET 86, which controls the current to UR corner 84 of surface 82. The UR corner FET 86 is thus alternately driven by such signal into low impedance and high impedance states synchronously with the reference signal 28, and is clamped to a common potential when UR corner FET 86 is in a low impedence state.

The reference signal 28 is also applied to inverter 100, the output of which is applied to the LL FET buffer 102. The output signal from LL FET buffer 102 varies the gate potential of LL corner FET 89, which controls the current to the LL corner 88 of surface 82. Thus, LL corner FET 89 is also alternately driven into low and high impedance states, but it is 180° out of phase in time with the UR corner FET 86. In this manner, the UR and LL corners 84 and 88, respectively, of conductive surface 82 are alternately clamped to a common potential.

FIG. 5 illustrates the AGC and ADC and associated circuitry 50. As discussed above, stylus 14 is used to detect the alternating potential on conductive surface 82. Stylus 14 consists of a high input impedance preamplifier (FIG. 7), the gain of which is voltage controlled. The gain of this pre-amp is varied by means of the gain control voltage 34, insuring that the voltages digitized by the ADC 16 utilize the full range of the ADC 16. The gain level voltage 34 is provided by the output of AGC circuitry 18 shown in FIG. 5, as discussed below.

The alternating voltage potential on the surface 82 detected by stylus 14 corresponds to the three-dimensional position at the point of coaction between stylus 14 and the surface 82. The stylus signal $V_S$ 36 is applied to an AC coupled differential amplifier 104 of conventional design. The reference to amplifier 104 is the reference ground and therefore esentially the same as the selected reference corner signal. The amplified stylus signal $V_S$ is then rectified by precision rectifier 104, outputting the rectified stylus signal $V_R$ 68.

The rectified signal $V_R$ 68 is then summed with a DC reference current at the summing input 116 of AGC integrator circuit 18. AGC integrator circuit 108 includes DC reference resistor 114, summing input resistor 118, and capacitor 120, which together with operational amplifier 110, comprise an integrator circuit in which the output integrates the input signals. At any instant when stylus 14 is held in one position over conductive surface 82, AGC integrator circuit 18 insures that the time-averaged sum of the four rectified stylus signals, $V_{x1} + V_{y1} + V_{x2} + V_{y2}$, is held equal to a predetermined constant S in accordance with the Reference Position Shift technique described above, and maintains this constant as the stylus height is varied. As described above, the X and Y coordinate positions measured by the present invention are independent of stylus height h when such time-averaged sums are held constant. Thus, within the range of AGC integrator circuit 18, which is designed to correspond to signals produced when the stylus is within the approximate dimensions of surface 82 (e.g., stylus 14 can be a foot or more above surface 82 for a square foot surface), AGC integrator circuit 18 holds the time-averaged sum of the four position-dependent voltages constant.

An alternative preferred embodiment of the present invention uses an AGC amplifier merely to restrict the absolute range of variation of the signals derived from the stylus 14, rather than to maintain the sum of such signals equal to a constant. Various other techniques are available for the same purpose and, in some instances, need not be employed at all provided the dynamic range of the measurement channels is sufficient.

For very rapid variations of the height of stylus 14, the time constant of AGC integrator circuit 18 may be too long to maintain the time-averaged sum required. However, the time constant chosen must be sufficiently long to integrate the average of all four time period signals. For drive switching rates of approximately 20 KHz, a time constant of approximately 25 milliseconds is sufficient. The calculations performed by the CPU 2, discussed below, permit rapid variations in stylus height to be made without affecting the calculated X, Y position values.

Thus, AGC integrator circuit 18 continuously integrates the average of the sum of the four voltage signals $(V_{x1} + V_{y1} + V_{x2} + V_{y2})$ and compares it to the DC reference voltage 112. As this averaged potential signal varies over time, the output of AGC integrating circuit 18 correspondingly varies in the opposite direction. Thus, as the time-averaged stylus potential decreases, the output voltage produced by AGC integrator circuit 18 increases, thereby increasing the gain of the stylus pre-amplifier. Conversely, as the time-averaged stylus potential increases, the output voltage produced by AGC integrator circuit 18 decreases, thereby decreasing the gain of the stylus pre-amplifier.

The gain control voltage signal 34 output by AGC integrator circuit 18 is inversely proportional to the stylus height h, permitting a constant scale factor to be maintained by AGC integrator circuit 18, as described in Equation (5). In this manner, the two pairs of output voltages, $V_{X1}$, $V_{X2}$ and $V_{Y1}$, $V_{YZ}$, enable the X and Y coordinates to be ascertained independent of h.

The rectified stylus signal $V_R$ 68 also passes to analog switch 124. The gain control voltage signal 34 output from the AGC integrator circuit 18 passes to the other input of analog switch 124. Analog switch 124 is controlled by the height control signal 40 output by CPU 2. In this manner, CPU 2 selectively receives the digitzed rectified stylus position signal $V_R$ 68 or the gain control voltage signal 34 from ADC 16 after sampling by sample and hold amplifier 126 as described below.

The output of analog switch 124 passes to a sample and hold amplifier 126, the gate of which is controlled by the sample signal 30 generated by timing generator 4. The sample and hold amplifier 126 then passes its output signal, $V_{SH}$ 70, to ADC circuit 16 upon receiving the sample signal 30 from timing generator 4.

Timing signals for the sample and hold amplifier 126 and to ADC circuit 16 are illustrated in FIG. 3. A sample signal 30 is generated for all four time periods, and when such sample becomes a logical "one", the data passed by analog switch 124 is input to the sample and hold amplifier 126. After such data is sampled and held, the IN CONV signal 32 initiates the conversion of such analog data signal into a comparable digital signal by ADC circuit 16 for subsequent outputting to CPU 2.

The ADC circuit 16 digitizes the $V_{SH}$ signal 70 for all four time periods in rapid succession, and then passes the digitized output to CPU 2 for subsequent computation. ADC circuit 128 provides a data ready signal 46 ("DR"), which is used by CPU 2 to synchronize its inputting of data with the outputting of data from ADC circuit 16. As illustrated in FIG. 3, the DR signal 46 becomes a logical "1" shortly after the signal conversion is completed.

The sample and hold amplifier 126 and ADC circuit 16 are of conventional design and are commercially available parts. However, ADC circuit 16 must generate a conversion in a time period less than the time required for the X and Y drive cycles to be completed. Commercially available ADC circuits suitable for use in the present invention are either flash type or SAR devices. In the preferred embodiment of the present invention, an Analog Device AD571JD SAR ADC is used. The conversion time for this ADC is 25 microseconds.

As discussed above, two other timing signals read by CPU 2, DA0 42 and DA1 44, are also produced by timing generator 4 (see FIG. 2). These signals allow CPU 2 to determine which of the four time periods it is reading data from in order to facilitate subsequent computation. For example, as illustrated in FIG. 3, when DA0 42 and DA1 44 signals are both a logical "1", CPU 2 is reading data from the X1 time period. The other three time regions are determined in a similar manner.

FIG. 3 also illustrates the waveforms of each stage of the conditioned stylus signal. $V_S$ 36 represents the stylus signal passing to amplifier 104, as discussed above. As seen in FIG. 3, $V_S$ 36 differs from the $V_{LL}$ and $V_{UR}$ signals 64 and 66, respectively, by an amount depending upon the gain control voltage 34 input to stylus 14 and upon its position relative to the edges of the conductive surface. The signal $V_R$ 68, as discussed above, represents the rectified $V_S$ signal 36 after it has passed through precision rectifier 106. The $V_{SH}$ signal 70 represents the analog signal passing from the sample and hold amplifier 126 to ADC circuit 16. As discussed above, when the sample signal 30 becomes a logical "1", the $V_{SH}$ signal 70 changes to represent the new inputted information from the sample and hold amplifier 126 to the ADC circuit 16. The valid data signal 72 is a representation of the digital output of the ADC circuit 16. As is shown by the valid data signal 72 of FIG. 3, there is a delay of one time period between, for example, the X1 time period and the period in which the digitzed data for the X1 time period is received by CPU 2.

CPU 2 is constructed with commercially available microprocessor or computer components. CPU 2 must have: (1) I-O capability to read the ADC circuit 16 data and timing signals, and to output the height control signal to the sample and hold analog switch; (2) high speed math capabilities; (3) buffer RAM; and (4) PROM or other non-volatile memory for code storage. The preferred embodiment of the present invention may, for example, be implemented with an Intel 8085A microprocessor in an Intel iSBC 80/24 CPU board with an iSBX 331 high speed floating point math module.

The CPU 2 has two primary functions. First, it performs the high speed calculations required to determine the X and Y coordinate positions independent of the stylus height h. Second, it permits the use of one stylus over multiple tablets.

CPU 2 handles rapid movements of the stylus 14 by sequentially inputting the digital values of the four voltages $V_{X1}$, $V_{Y1}$, $V_{X2}$ and $V_{Y2}$. It then calculates the two sums:

$$V_{xs} = V_{x1} + V_{x2} \quad (7)$$

$$V_{ys} = V_{y1} + V_{y2} \quad (8)$$

CPU 2 can then determine the height independent X-Y position of the stylus 14 by dividing predetermined range constants, $R_x$ and $R_y$, by the respective sums of the two coordinate voltage pairs and using that value as a multiplier to determine the X and Y coordinate position of the stylus 14. Thus:

$$X = \frac{R_x}{V_{xs}} (V_{x1}) \quad (9)$$

$$Y = \frac{R_y}{V_{ys}} (V_{y1}) \quad (10)$$

Such predetermined range constants depend upon the number of bits which are utilized to digitize the analog stylus signal. For example, where the stylus signal is digitized to 10 bits, the range constants are determined so as to permit the X and Y values to range from 0 to 1024.

In addition, CPU 2 can scale and shift the X and Y coordinates by adding offset constants (e.g., X off and Y off) to the X and Y coordinates. CPU 2 can also vary the range of X and Y values by scaling the constants $R_x$ and $R_y$.

In a preferred embodiment of the invention, the stylus is constructed as shown in FIG. 7. It consists of a pick-up antenna 150 connected to the gate of an FET 152. The FET 152 serves as a transconductance preamplifier for the stylus signal. The gate of the FET 152 is biased with resistor 154. The output of the FET 152 passes to the stylus decoder circuitry through a shielded cable 160. A portion of the antenna 150 and the FET 152 are enclosed in a Faraday cage 156. A portion of the stylus pick-up antenna 150 remains outside the Faraday cage in order to detect the output of the sensor surface. The entire stylus assembly is encapsulated within an insulating material 158.

With reference to FIG. 6, the conductive layer 134 of surface 82, as discussed hereinafter, can be any continuous sheet or semi-continuous sheet (e.g., mesh or microhole etched) of electrically conductive material. Such materials may be optically transparent, translucent or opaque. It is advantageous for the surface 82 to be transparent as it can then be placed in front of visual displays (not shown), such as CRTs or rear-screen projection devices, which manifest the electrical representations of the spatial coordinates in a graphic display. Among the optically transparent, conductive materials suitable for conductive layer 134 in the present invention are stannous oxide, indium oxide or thin metal films deposited on transparent substrates of quartz, glass or optical grade acetate. Wire meshes or etched sheets may be used in situations demanding extreme ruggedness, large sizes or curved surfaces.

One preferred embodiment of the surface construction is illustrated in FIG. 6. It consists of seven layers that are laminated together using a pressure sensitive adhesive. The surface 82 is constructed on a supporting base surface 130 consisting of a clear piece of commercial grade plexiglass. Bonding layer 132 is a double-sided Mylar adhesive used to bond conductive material layer 134 to base surface 130. Conductive material layer 134 consists of a foil of thin gold film deposited on an optical grade acetate substrate. This acetate substrate has a nominal thickness of 7/1000 inch and the gold is deposited with a resistivity of 25 ohms per square.

A protective layer of single-sided Mylar, pressure sensitive adhesive 138 is laminated over the conductive film to protect it from mechanical scratches or other abrasion. This protective layer 138 is laminated over the gold foil in conductive layer 134 in a manner leaving a one-half inch border on the entire perimeter so that ohmic contact between the transformers 144 and the gold foil can easily be made.

A printed circuit board 140 is laminated over the protective Mylar adhesive layer 138 using a double-sided adhesive 142. The printed circuit board 140 is constructed with a hole in the center so that the tablet is optically transparent. Printed circuit board 140 has transformers 144 mounted at an edge. The secondaries of transformers 144 are interconnected on printed circuit board 140 through holes 146 punched in the perimeter. The double sided adhesive 142 also has holes punched in its perimeter and a hole cut in its center to match the holes in the printed circuit board 140.

Ohmic contact is made between the transformer secondaries and the gold film in conductive layer 134 by filling the holes 146 in the perimeter with a commercially available silver conductive epoxy. The entire conductive surface 82 has a thickness of less than one-quarter inch, and the perimeter of the surface 82 is typically ten inches vertical by fifteen inches horizontal.

Figure 10:
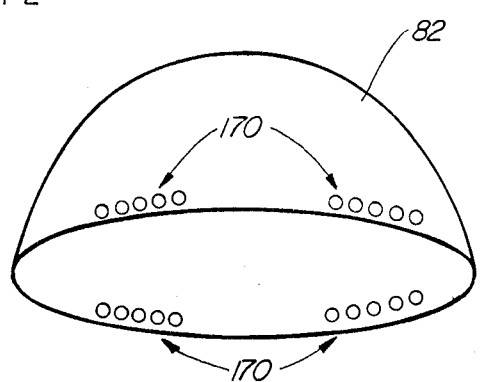
FIG. 10 is a schematic illustration of an alternative preferred embodiment of the present invention in which the conductive surface is a portion of a sphere.

The conductive surface in the present invention need not be planar. In an alternative preferred embodiment illustrated in FIG. 10, for example, the conductive surface 82 is a portion of a sphere. Ohmic contact is provided for applying the drive current via four groups (or regions) of holes 170 (i.e., two pairs of regions).

In the preferred embodiment illustrated in FIG. 6, five transformers 144 are used to drive conductive material layer 134. The number of secondaries required on each set of transformers is dependent upon the actual size of the surface. The more secondaries employed, the more linear the equipotential lines will be near the edges of the surface, thereby producing a more continuous current sheet. On surfaces with dimensions of ten inches and fifteen inches, for example, this result is satisfactorily achieved by having one secondary for every inch along the edges of the surface. In the preferred embodiment, each of the five transformers 144 has one primary and five independent secondaries. This is for convenience of construction. More or fewer secondaries may be used on each transformer. Thus, a surface which is ten inch vertical by fifteen inch horizontal would have ten secondaries from two transformers connected to the ten-inch edge and fifteen secondaries from three transformers connected to the fifteen-inch edge. The two primaries of the two transformers connected to the ten-inch edge are connected in parallel, and are driven by the X drive buffer 90 (see FIG. 4). Similarly, the three primaries on the three transformers connected to the fifteen-inch edge are connected in parallel, and are driven by the Y drive buffer 76.

The seondaries are connected to conductive surface 82 in proper order and with proper phasing to insure that the alternating current flows as a continuous sheet from one edge to the other. The transformers 144 are constructed with a center-taped primary and five secondaries. The transformers 144 have a primary to secondary turns ratio of one-to-one, and are of conventional ferrite E—E bobbin wound design.

In the multiple conductive surface embodiment of the present invention, CPU 2 determines which conductive surface the stylus 14 is positioned over by sequentially turning the X and Y drives on and off for each conductive surface. While CPU 2 is polling the surfaces in this manner, it inputs the gain control voltage signal 34 into ADC circuit 16, and compares it to a predetermined value which approximates the saturation level of the AGC integrator circuit 18. Such saturation level is reached when the stylus 14 is positioned sufficiently far away from the surface 82. If the gain control voltage signal 34 has reached this pre-determined level, indicating the stylus 14 is either not over or is too far away from the surface being polled, CPU 2 sequentially polls the remaining surfaces. When the gain control voltage signal 34 has not reached such saturation level, CPU 2 proceeds to calculate the X and Y coordinate positions of the stylus 14 as described above. CPU 2 maintains the X and Y drive signals on the active surface so long as the gain control voltage signal 34 remains less than the saturation level.

In another embodiment of the invention multiple conductive surfaces may be decoded by driving each conductive surface 82 with a different fundamental drive frequency. In this embodiment, the stylus signal passes, in addition to the AGC 18 and ADC 16 previously described, to tone decoder circuitry (not illustrated), the output of which then passes to the CPU 2 as previously described. The tone decoder circuitry serves to detect the fundamental frequency of the stylus signal. The fundamental frequency of the stylus signal will be dependent upon which source surface the stylus 14 is positioned over. Consequently, the CPU 2 can determine which conductive surface the stylus 14 is positioned over from the output of the tone decoder circuitry.

In yet another embodiment of the invention, as shown in FIG. 8, multiple energized conductive surfaces may be utilized to determine the position of stylus 14 in three-space. In this embodiment two energized conductive surfaces 172 and 174 are positioned at an angle $\phi$ with respect to one another as shown. The X, Y position of the stylus 14 is determined over energized conductive surface 174, then the stylus X, Y position is determined over the other energized conductive surface 172. The three-dimensional position of stylus 14 is determined by calculating the orthogonal components X, Y of energized conductive surface 172 with respect to energized conductive surface 174.

In yet another embodiment of the invention more than two energized conductive surfaces can be positioned at angles with respect to each other to more precisely determine the stylus position in three-space.

In another embodiment of the invention, a plurality of transformers are utilized to generate the X and Y currents on conductive surface 82 as shown in FIG. 11. In this embodiment, the X drive buffer 76 provides current for a plurality of transformers 201, 203 having their primaries 202, 206 wired in parallel. The secondaries 200, 204 of the X transformers 201, 203 provide current to conductive surface 82. Similarly, the Y drive buffer 90 provides current for a plurality of Y drive transformers 205, 207 having their primaries 210, 214 also wired in parallel. The secondaries 208, 212 of the Y transformers 205, 207 are wired to the conductive surface 82. The X transformers 201, 203 and the Y transformers 205, 207 are wired with proper phasing to ensure that current flows uniformly from one edge to another when the drives are activated. Although only two transformers are shown in FIG. 11 for each respective drive, it should be obvious to one skilled in the art that the present invention can be implemented with more than two transformers per drive.

Figure 12:
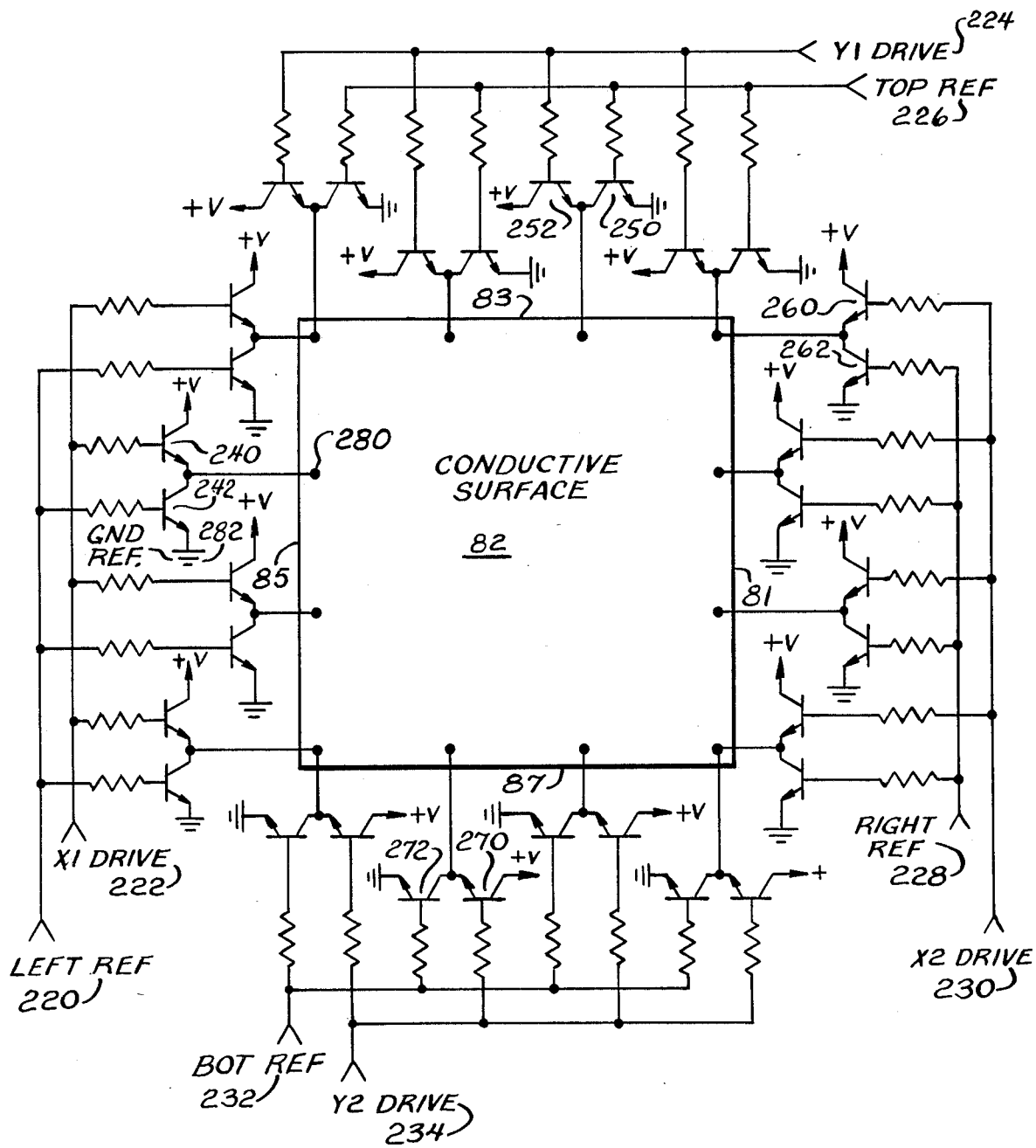
FIG. 12 is a schematic illustration of an alternative preferred embodiment of the present invention using two pairs of active solid-state generators, wherein the pairs are substantially electrically isolated from one another.
Figure 13:
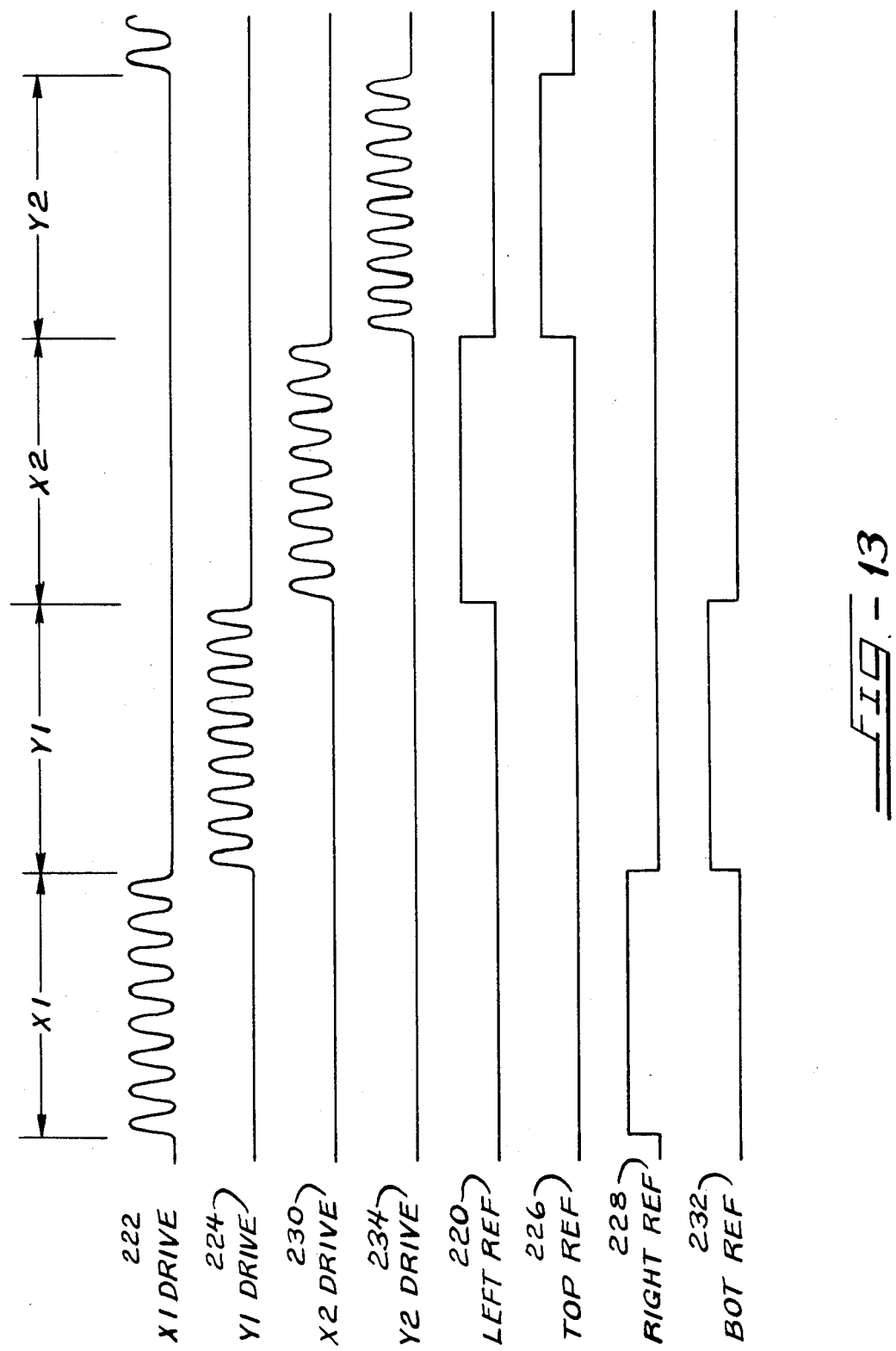
FIG. 13 is an electrical timing diagram illustrating the timing relationships between the various signals utilized in the solid-state generators of the alternative preferred embodiment of the present invention depicted in FIG. 12.

In yet another embodiment of the present invention, the X and Y drive currents are provided by solid state generators. FIG. 12 illustrates the use of two pairs of active solid state drive generators and FIG. 13 illustrates the timing relationships between the various electrical signals utilized in the solid state drive generators. As shown in FIG. 12, ohmic contact 280 is made between the conductive surface 82 and a corresponding pair of transistors 240, 242 that serve to provide current to the edge 85 when the corresponding drive signal 222 is activated or serve to clamp the edge to a reference ground 282 when the corresponding reference signal 220 is activated. As described with reference to FIG. 13 below, the other corresponding pairs of transistors in FIG. 12 operate in a similar manner. In the solid state generator embodiment of the present invention, each entire edge of the four edges 81, 83, 85 and 87 of conductive surface 82 is alternately clamped to referenced ground 282.

FIG. 13 shows that the reference signals 220, 226, 228, and 232 are alternately activated in succession. The drive signals 222, 224, 230 and 234 are also alternately activated in succession in the same order as the reference signals, but 180 degrees out of phase with respect to the reference signals. When the X1 drive 222 is activated, the right reference 228 is also activated. In like manner, when the Y1 drive 224 is activated, the bottom reference 232 is also activated. This pairing of drive signals and alternate side reference signals ensures that current flows uniformly in one direction from one edge to the other corresponding edge. As a result, the current flow is controlled in a plurality of directions on conductive surface 82.

The stylus position over the conductive surface driven by solid state generators is calculated in the manner discussed earlier. It should also be obvious to one skilled in the art that the present invention can be implemented with other solid state device such as PNP transistors, field effect transistors or controlled rectifiers.

Although the invention has been described in terms of a preferred embodiment, it will be obvious to those skilled in the art that many alterations and modifications may be made without departing from the invention. Accordingly, it is intended that all such alterations and modifications be included within the spirit and scope of the invention as defined by the appended claims.

What is claimed is:

1. An apparatus for determining the spatial position of a probe with respect to a conductive surface comprising:

conductive surface means having first and second pairs of regions;

drive means for alternately providing current to the first pair of regions of said conductive surface means and to the second pair of regions of said conductive surface means;

reference position shift means for alternately clamping first and second locations on said conductive surface means to a reference potential, said reference position shift means alternately clamping the first and second locations to the reference potential while said drive means provides current in succession to each of the first and second pairs of regions per each referene position;

probe means for providing a potential signal related to the potential on said conductive surface means at a point nearest to said probe means, said probe means providing a first potential signal when the first location on said conductive surface means is clamped to the reference potential by said reference position shift means and a second potential signal when the second location on said conductive surface means is clamped to the reference potential by said reference position shift means; and processor means for determining a first coordinate position of said probe means with respect to said conductive surface means from a relationship between said first and second potential signals and values of said first and second potential signals during the time said drive means is providing current to the first pair of regions of said conductive surface means, and for determining a second coordinate position of said probe means with respect to said conductive surface means from the relationship between said first and second potential signals and the values of said first and second potential signals during the time said drive means is providing current to the second pair of regions of said conductive surface means.

2. The apparatus as claimed in claim 1 which further comprises:

controlled gain amplifier means for maintaining a sum of said first potential signal and said second potential signal equal to a constant, the gain of said controlled gain amplifier means being varied in accordance with the orthogonal distance between said probe means and said conductive surface means, and wherein said processor means determines the first coordinate position from the relationship between the value of said constant sum of said first and second potential signals and the values of said first and second potential signals during the time said drive means is providing current to the first pair of regions, and for determining the second coordinate position of said probe means from the relationship between the value of said constant sum of said first and second potential signals and the values of said first and second potential signals during the time said drive means is providing current to the second pair of regions.

3. The apparatus as claimed in claim 2 wherein said processor means determines the orthogonal distance between said probe means and said conductive surface means from the gain of said controlled gain amplifier means.

4. The apparatus as claimed in claim 2 further comprising at least one additional conductive surface means, wherein when said probe means is not positioned above said conductive surface means, the gain of said controlled gain amplifier means exceeds a predetermined level while current is being provided to said conductive surface means and first and second potential signals are being produced by said probe means, and wherein said processor means controls said drive means to provide current to one of said conductive surface means and, while current is being provided to said one of said conductive surface means, said processor means determines the gain of said controlled gain amplifier means, and if the gain is less than the predetermined level the position of said probe means with respect to said one of said conductive surface means is determined, and if the gain exceeds the predetermined level said processor means causes said drive means to cease providing current to said one of said conductive surface means and to provide current to another of said conductive surface means, whereby each of said conductive surface means is polled by said processor means and the position of said probe means is determined with respect to the one of said conductive surface means above which said probe means is positioned.

5. The apparatus as claimed in claim 2 wherein said probe means further comprises rectifying means for rectifying the first and second potential signals to provide a time averaged value thereof and wherein said controlled gain amplifier means further comprises automatic gain control circuit means, the output of which is inversely proportional to the time averaged value of the first and second potential signals.

6. The apparatus as claimed in claim 1 wherein said reference position shift means alternatively clamps more than two locations on said conductive surface means to a reference potential, wherein said probe means provides a separate potential signal when each of the locations on said conductive surface means is clamped to the reference potential, and wherein said processor means determines the first and second coordinate positions from the relationships among the potential signals and their values.

7. The apparatus as claimed in claim 1 wherein said conductive surface means comprises a non-planar surface.

8. The apparatus as claimed in claim 1 wherein said conductive surface means comprises a planar surface.

9. The apparatus as claimed in claim 1 wherein said drive means provides current to the first and second pairs of regions by inductive coupling.

10. The apparatus as claimed in claim 1 wherein said probe means provides said first and second potential signals, with reference to the first and second locations, respectively, alternately clamped to the reference potential, by capacitive coupling between said probe means and said conductive surface means.

11. The apparatus as claimed in claim 1 wherein each of said first and second pairs of regions includes an array of electrical contacts.

12. The apparatus as claimed in claim 1 wherein data corresponding to an impedance between a plurality of points on said conductive surface means and the perimeter thereof are stored in a memory means, and said data are utilized by said processor means to determine a position coordinate on said conductive surface means from said first and second potential signals.

13. The apparatus as claimed in claim 1 wherein said conductive surface means is substantially rectangular and said first and second locations that are clamped to the reference potential by said reference position shift means are in opposing corners of said conductive surface means.

14. The apparatus as claimed in claim 1 wherein said drive means further comprises:
first and second transformer means, each of said first and second transformer means having at least one primary and at least one secondary, a first end of the at least one secondary of said first transformer means being connected to a first region of a first pair of regions of said conductive surface means and a second end of the at least one secondary of said first transformer means being connected to a second region of the first pair of regions of said conductive surface means, a first end of the at least one secondary of said second transformer means being connected to a first region of a second pair of regions of said conductive surface means and a second end of the at least one secondary of said second transformer means being connected to a second region of the second pair of regions of said conductive surface means.

15. The apparatus as claimed in claim 14 wherein said first and second transformer means includes more than one secondary and wherein a first end and a second end of said secondaries of said first transformer means are connected respectively to the first and second regions of the first pair of regions in such order and phasing as to cause alternating current to flow in a continuous sheet between the first and second regions of the first pair of regions and wherein a first end and a second end of said secondaries of said second transformer means are connected respectively to the first and second regions of the second pair of regions in such order and phasing as to cause alternating current to flow in a continuous sheet between the first and second regions of the second pair of regions.

16. The apparatus as claimed in claim 14 wherein each of said first and second transformers includes more than one primary and wherein the primaries of said first transformer means are connected in parallel and the primaries of said second transformer means are connected in parallel.

17. The apparatus as claimed in claim 1 wherein said conductive surface means further comprises a gold film deposited on a polymer substrate.

18. The apparatus as claimed in claim 1 wherein said conductive surface means further comprises:
a supporting base;
a conductive layer;
first layer means for bonding said conductive layer to said supporting base;
second layer means deposited over said conductive layer to protect said conductive layer, said second layer means being dimensioned to leave an exposed strip along the perimeter of said conductive layer for making electrical connection thereto;
a printed circuit board configured with a hole on the interior thereof; and
third layer means for bonding said printed circuit board to said second layer means.

19. The apparatus as claimed in claim 1 further comprising a controlled gain amplifier means to restrict a absolute range of variation of the signals derived from said probe means.

20. An apparatus for determining at least three spatial coordinates of an object with respect to a surface, the apparatus comprising:
conductive surface means,
energizing means for energizing said conductive surface means;
a plurality of reference means;
distinguishng means for distinguishing each of said reference means;
probe means for providing a signal corresponding to the reference means distinguished by said distinguishing means and to the location of said probe means in relationship to said conductive surface means; and
signal processing means responsive to the signal provided by said probe means and to said energizing means for producing an output signal uniquely representative of the location of said probe means with respect to said conductive surface means.

21. The apparatus as claimed in claim 20 wherein said conductive surface means has at least first and second pairs of regions, each of said first and seoond pairs of regions being approximately rectilinear and in proximity to one boundary of the desired working area of said conductive surface means, said first pair of regions being substantially parallel to each other and said second pair of regions being substantially parallel to each other, and wherein said energizing means has at least first and second sets of paired output means, each of said first and second sets of paired output means comprising at least one output pair, each of said output pairs being substantially electrically isolated from the other said output pairs.

22. The apparatus as claimed in claim 21 wherein each of the output pairs of said first and second sets of paired output means comprises the ends of a transformer winding.

23. The apparatus as claimed in claim 21 wherein each of said first and second sets of paired output means comprises at least one pair of active solid-state generators, each of said pairs of generators being substantially electrically isolated from the other said pairs of generators.

24. The apparatus as claimed in claim 21 wherein said first pair of regions is energized by said energizing means during a first time period and said second pair of regions is energized during a second time period, whereby said signal processing means produces an output signal uniquely representative of the location of said probe means with respect to a coordinate axis orthogonal to said first pair of regions during said first time period and an output signal uniquely representative of the location of said probe means with respect to a coordinate axis orthogonal to said second pair of regions during said second time period.

25. The apparatus as claimed in claim 24 wherein said energizing means includes switching means to energize said first and second pairs of regions during said first and second time periods, respectively.

26. A process for determining at least two spatial coordinates of an object with respect to a surface, which comprises:
   energizing a conductive surface along a first axis thereby creating a field in the vicinity of said conductive surface and along the first axis;
   sensing a first field potential difference between the location of the object and a first reference location;
   sensing a second field potential difference between the location of the object and a second reference location;
   summing the first and second sensed potential differences;
   scaling the first and second potential differences by a first scale variable to cause the sum to equal a constant;
   determining a first coordinate from the scaled first potential difference;
   energizing the conductive surface along a second axis substantially orthogonal to the first axis thereby creating a field in the vicinity of said conductive surface and along the second axis;
   sensing a third field potential difference between the location of the object and the first reference location;
   sensing a fourth field potential difference between the location of the object and the second reference location;
   summing the third and fourth sensed potential differences;
   scaling the third and fourth sensed potential differences by a second scale variable to cause the sum to equal a constant; and
   determining a second coordinate from the scaled third potential difference.

27. The process as claimed in claim 26 further comprising determining a third spatial coordinate of the object generally orthogonal to the surface by:
   noting the first scale variable by which the first and second sensed potential differences are scaled; and
   determining the third orthogonal coordinate from a table of predetermined data relating the scale variable with the third orthogonal coordinate.

28. The process as claimed in claim 26 wherein the first scale variable and the second scale variable are equal.

29. An apparatus for determining spatial coordinates of an object with respect to at least two surfaces comprising:
   first conductive surface means for carrying signals corresponding to at least two dimensional positional coordinates of the object with respect to said surface means;
   second conductive surface means for carrying signals corresponding to at least two dimensional positional coordinates of the object with respect to said surface means;
   energizing means for energizing said first and second conductive surface means;
   probe means for providing a probe signal corresponding to the signals carried by said first and second conductive surface means; and
   signal processing means responsive to the probe signal for producing output data uniquely representative of the location of said probe means with respect to at least a selected one of said first and second conductive surface means.

30. An apparatus for determining the spatial coordinates of an object with respect to a surface, the apparatus comprising:
   a plurality of conductive surface means, each carrying signals corresponding to at least two dimensional position coordinates of the object with respect to that particular surface means;
   energizing means for energizing each of said conductive surface means at an energizing frequency different from the energizing frequencies at which the other of said conductive surfaces are energized;
   a plurality of reference means on each of said conductive surface means;
   selecting means for selecting each of said reference means;
   probe means responsive to the energizing of at least one of said conductive surface means for providing a probe signal corresponding to the reference means selected, to the signals carried by the at least one of said conductive surface means and to the energizing frequency of the at least one of said conductive surface means;
   decoder means responsive to the probe signal for detecting the energizing frequency of the at least one of said conductive surface means and thereby determining which of said conductive surface means the probe signal is responsive to; and
   signal processing means responsive to the probe signal and to said energizing means for producing an output signal uniquely representative of the location of said probe means with respect to each of said conductive surface means to which the probe signal is responsive.

31. An apparatus for determining the spatial position of a probe with respect to a conductive surface, comprising:
   conductive surface means having first and second pairs of regions;
   drive means for providing alternating current at a first frequency to the first pair of regions of said conductive means and for providing alternating current at a second frequency to the second pair of regions of said conductive means;
   reference position shift means for alternately clamping first and second locations on said conductive surface means to a reference potential, said reference position shift means alternately clamping the first and second locations to the reference potential while said drive means provides current in succession to each of the first and second pairs of regions per each reference position;

probe means for providing a potential signal related to the potential on said conductive surface means at a point on said conductive surface means nearest to said probe means, said probe means providing a first potential signal when the first location on said conductive surface means is clamped to the reference potential by said reference position shift means and a second potential signal when the second location on said conductive surface means is clamped to the reference potential by said reference position shift means; and processor means for determining a first coordinate position of said probe means with respect to said conductive surface means from a relationship between said first and second potential signals and values of said first and second potential signals derived from the alternating current at said first frequency provided to the first pair of regions of said conductive surface means, and for determining a second coordinate position of said probe means with respect to said conductive surface means from the relationship between said first and second potential signals and the values of said first and second potential signals derived from the alternating current at said second frequency provided to the second pair of regions of said conductive surface means.

32. An apparatus for determining the spatial position of a probe with respect to a conductive surface, comprising:

conductive surface means having first and second pairs of regions;

drive means for providing current to said first and second pairs of regions in quadrature, whereby the current is provided to said first and second pairs of regions with a phase difference of one-fourth of one period.

reference position shift means for alternately clamping first and second locations on said conductive surface means to a reference potential, said reference position shift means alternately clamping the first and second locations to the reference potential while said drive means provides current in succession to each of the first and second pairs of regions per each reference position;

probe means for providing a potential signal related to the potential on said conductive surface means at a point on said conductive surface means nearest to said probe means, said probe means providing a first potential signal when the first location on said conductive surface means is clamped to the reference potential by said reference position shift means and a second potential signal when the second location on said conductive surface means is clamped to the reference potential by said reference position shift means; and processor means for determining a first coordinate position of said probe means with respect to said conductive surface means from a relationship between the first and second potential signals and values of said first and second potential signals derived from the current provided at the first of two said phases one-fourth of one period apart to the first pair of regions of said conductive surface means, and for determining a second coordinate position of said probe means with respect to said conductive surface means from the relationship between said first and second potential signals and the values of said first and second potential signals derived from the current provided at the second of two said phases one-fourth of one period apart to the second pair of regions of said conductive surface means.

33. The apparatus as claimed in claim 29 wherein each of said conductive surface means is planar, and wherein the plane of the first conductive surface and plane of the second conductive surface are not substantially parallel.

34. The apparatus as claimed in claim 29 wherein each of said conductive surface means is planar, and wherein the plane of the first conductive surface and the plane of the second conductive surface are not substantially co-planar.

35. The apparatus as claimed in claim 29 wherein each of said conductive surface means is planar, and wherein the plane of a first conductive surface and the plane of a second conductive surface are substantially orthogonal to one another.

36. The apparatus as claimed in claim 29 wherein the apparatus can determine at least three spatial coordinates of the object with respect to the at least two surfaces.

* * * * *

UNITED STATES PATENT AND TRADEMARK OFFICE
CERTIFICATE OF CORRECTION

PATENT NO. : 4,603,231
DATED : July 29, 1986
INVENTOR(S) : Leonard Reiffel and Wayne D. Jung It is certified that error appears in the above-identified patent and that said Letters Patent is hereby corrected as shown below:

Column 1, line 25, "Aidd" should be -- Aided --
Column 2, line 68, "Voltaga" should be -- Voltage --
Column 3, line 24, "uht" should be -- the --.
Column 6, line 14, "given coordinate" should be
   -- given X coordinate --
Column 7, line 60, "waveform" should be -- waveforms --
Column 11, line 22, "104" should be -- 106 --
Column 11, line 26, "108" should be -- 18 --
Column 12, line 24, "digitized" should be -- ditigized --
Column 13, line 23, "digitized" should be -- ditigized --
Claim 21, column 20, line 50, "seoond" should be -- second --

Signed and Sealed this

Twentieth Day of January, 1987

*Attest:*

DONALD J. QUIGG

*Attesting Officer*    *Commissioner of Patents and Trademarks*